United States Patent
Chevers et al.

(10) Patent No.: US 10,717,339 B2
(45) Date of Patent: Jul. 21, 2020

(54) START AND STOP BLOWER MAP BASED ON SUNLOAD TO IMPROVE FUEL ECONOMY

(71) Applicant: Toyota Motor Engineering & Manufacturing North America, Inc., Plano, TX (US)

(72) Inventors: Netsanet S. Chevers, Ann Arbor, MI (US); Hidekazu Hirabayashi, Ann Arbor, MI (US); David W. Cosgrave, Royal Oak, MI (US); Stefan Young, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 275 days.

(21) Appl. No.: 15/928,017

(22) Filed: Mar. 21, 2018

(65) Prior Publication Data
US 2019/0291533 A1    Sep. 26, 2019

(51) Int. Cl.
*B60H 1/00* (2006.01)
*B60H 1/32* (2006.01)

(52) U.S. Cl.
CPC ....... *B60H 1/0075* (2013.01); *B60H 1/00778* (2013.01); *B60H 1/00885* (2013.01); *B60H 1/3208* (2013.01); *B60H 2001/3261* (2013.01); *B60H 2001/3263* (2013.01); *B60H 2001/3282* (2013.01)

(58) Field of Classification Search
CPC ............... B60H 1/0075; B60H 1/3208; B60H 1/00885; B60H 1/00778; B60H 2001/3261; B60H 2001/3263; B60H 2001/3282
See application file for complete search history.

(56) References Cited

U.S. PATENT DOCUMENTS

| 5,511,724 A * | 4/1996 | Freiberger ......... B60H 1/00735 236/49.3 |
| 5,547,125 A | 8/1996 | Hennessee et al. |
| 5,653,904 A | 8/1997 | Adlparvar et al. |

(Continued)

FOREIGN PATENT DOCUMENTS

JP    2006151098    6/2006

OTHER PUBLICATIONS https://www.howacarworks.com/basics/how-car-heating-and-ventilation-systems-work; 7 pages.
http://www.airconcars.com/html/how_it_works.html; 3 pages; 2018.

*Primary Examiner* — Mary Cheung
(74) *Attorney, Agent, or Firm* — Snell & Wilmer LLP

(57) ABSTRACT

Methods, systems, and apparatus for managing climate control. The control system includes one or more sensors that are configured to measure sunload energy. The control system includes a heating, ventilation and air conditioning (HVAC) unit that is configured to output air with an airflow rate into the cabin of the vehicle. The electronic control unit is configured to obtain the amount of sunload energy and obtain a blower map based on the amount of sunload energy. The electronic control unit is configured to determine the airflow rate based on the obtained blower map and an expected temperature. The electronic control unit is configured to control the airflow rate to adjust an air temperature within the cabin of the vehicle to reach the expected temperature therefore increasing the fuel efficiency.

19 Claims, 8 Drawing Sheets

(56) References Cited

U.S. PATENT DOCUMENTS

| | | |
|---|---|---|
| 5,699,857 A | 12/1997 | Flaishans et al. |
| 5,706,667 A * | 1/1998 | Iritani ................ B60H 1/00828 |
| | | 165/244 |
| 5,988,517 A | 11/1999 | Bauer et al. |
| 5,995,889 A | 11/1999 | Eisenhour |
| 6,304,803 B1 | 10/2001 | Dao |
| 6,454,178 B1 | 9/2002 | Fusco et al. |
| 6,868,900 B2 | 3/2005 | Dage et al. |
| 6,971,246 B2 | 12/2005 | Kurata et al. |
| 7,156,167 B2 | 1/2007 | Errington et al. |
| 8,151,581 B2 | 4/2012 | Chen et al. |
| 8,346,422 B2 | 1/2013 | Chen |
| 8,626,381 B2 | 1/2014 | Tate, Jr. et al. |
| 8,655,491 B2 * | 2/2014 | Hadzidedic .............. F24F 11/77 |
| | | 700/276 |
| 8,745,997 B2 | 6/2014 | Kumar et al. |
| 8,839,632 B2 | 9/2014 | Goenka et al. |
| 8,849,487 B2 | 9/2014 | Malone et al. |
| 9,168,810 B2 | 10/2015 | Ghosh et al. |
| 9,272,602 B2 | 3/2016 | Rollinger et al. |
| 9,662,959 B2 | 5/2017 | Pebley et al. |
| 9,694,652 B2 | 7/2017 | An et al. |
| 9,758,011 B2 | 9/2017 | Johnston |
| 9,840,126 B2 | 12/2017 | Kanemaru et al. |
| 2010/0106334 A1 * | 4/2010 | Grohman ................ G05B 15/02 |
| | | 700/278 |
| 2010/0236770 A1 | 9/2010 | Pursifull |
| 2010/0304654 A1 | 12/2010 | Kakizaki et al. |
| 2011/0309786 A1 * | 12/2011 | Hassan .................. B60K 16/00 |
| | | 320/101 |
| 2013/0196586 A1 | 8/2013 | Hoke et al. |
| 2015/0224851 A1 | 8/2015 | Baker |
| 2015/0298522 A1 * | 10/2015 | Hirabayashi ....... B60H 1/00921 |
| | | 701/36 |
| 2016/0018153 A1 | 1/2016 | Ragazzi |
| 2017/0096048 A1 * | 4/2017 | Larson ................. B60H 1/3207 |
| 2017/0267065 A1 | 9/2017 | Kim et al. |
| 2017/0368909 A1 | 12/2017 | Choi et al. |
| 2018/0208018 A1 * | 7/2018 | Blatchley ............... B60H 1/034 |

* cited by examiner

US 10,717,339 B2

START AND STOP BLOWER MAP BASED ON SUNLOAD TO IMPROVE FUEL ECONOMY

BACKGROUND

Field

This specification relates to controlling the heating, ventilation, and air conditioning (HVAC) unit within a vehicle.

Description of the Related Art

In vehicles, a start-stop system automatically shuts off the internal combustion engine to reduce the amount of time that the engine idles when the vehicle is not in motion. For example, at a traffic light when a driver depresses the brake pedal to stop the vehicle, the start-stop system may activate and shut down the engine to reduce fuel consumption and emissions. When the driver releases the brake pedal and depresses the accelerator pedal, the start-stop system will reactivate the engine to provide power to move or propel the vehicle. While the vehicle is stopped, the driver may continue to operate the heating, ventilation and air conditioning (HVAC) unit to maintain a comfortable temperature within the vehicle. The engine may restart if there is insufficient energy to cool or heat the vehicle. The use of the air conditioner or heater when a vehicle is idle decreases the energy efficiency and/or savings of the start-stop system.

Accordingly, there is a need for a system and method for improving the energy efficiency of the HVAC unit to improve the overall fuel efficiency of the vehicle, while maintaining comfort while the vehicle is stopped.

SUMMARY

In general, one aspect of the subject matter described in this specification may be embodied in a control system for a vehicle that regulates or manages the speed of a blower or fan for the air conditioner or heater to regulate temperature within the cabin of the vehicle. The control system can improve fuel efficiency by minimizing power usage when the vehicle is stopped. The control system includes one or more sensors. Some of which are configured to measure an amount of sunload energy. The control system includes a heating, ventilation and air conditioning (HVAC) unit. The HVAC unit is configured to output air with an airflow rate into the cabin of the vehicle. The control system includes a memory for storing multiple blower maps that associate different airflow rates with different temperature ranges within the cabin of the vehicle. The control system includes an electronic control unit. The electronic control unit is connected to the one or more sensors and the HVAC unit and configured to obtain an expected temperature. The expected temperature is within a temperature range. The electronic control unit is configured to obtain, from the one or more sensors, the amount of sunload energy and obtain, from the memory, a blower map from the multiple blower maps based on the amount of sunload energy. The electronic control unit is configured to determine the airflow rate based on the obtained blower map and the expected temperature being within the temperature range. The electronic control unit is configured to control, using the HVAC unit, the airflow rate of the outputted air to adjust an air temperature within the cabin of the vehicle to reach the expected temperature.

These and other embodiments may optionally include one or more of the following features. The one or more sensors may include a vehicle speed sensor. The vehicle speed sensor may be configured to measure a speed of the vehicle. The electronic control unit may be configured to determine, using the vehicle speed sensor, that the vehicle is stopped based on the speed of the vehicle. The one or more sensors may include an engine sensor. The engine sensor may be configured to detect a state of the engine. The electronic control unit may be configured to cause the engine to switch to an off state in response to determining that the vehicle is stopped. The electronic control unit may be configured to control, using the HVAC unit, the airflow rate to adjust the temperature in response to the engine being in the off state.

The electronic control unit may be configured to determine that the amount of sunload energy is within a first range or within a second range. The electronic control unit may select a first blower map to obtain when the sunload energy is within the first range and select a second blower map to obtain when the sunload energy is within the second range.

The one or more sensors may include a sensor, such as a sunload sensor, that measures an amount of sunlight directed at the vehicle and/or a cabin temperature sensor that measure the temperature within the cabin of the vehicle. The electronic control unit may be configured to receive user input. The electronic control unit may calculate a target airflow temperature based on the user input. The electronic control unit may calculate a target evaporator temperature and determine the expected temperature based on the calculated target airflow temperature and the target evaporator temperature. The electronic control unit may determine that the HVAC is on and may increase or decrease the airflow rate through the HVAC to increase or decrease the temperature.

In another aspect, the subject matter may be embodied in a control system for a vehicle. The control system includes one or more sensors configured to measure an amount of thermal energy. The control system includes a heating, ventilation and air conditioning (HVAC) unit that is configured to output or circulate air having an airflow rate within the vehicle. The control system includes a memory for storing multiple blower maps that associate the airflow rate with an expected temperature. The control system includes a processor connected to the one or more sensors and the HVAC unit. The processor is configured to obtain, from the one or more sensors, the amount of thermal energy. The processor is configured to obtain, from the memory, a blower map from the multiple blower maps based on the amount of thermal energy. The processor is configured to determine the airflow rate based on the blower map and the expected temperature. The processor is configured to increase or decrease, using the HVAC unit, the airflow rate to adjust a temperature within the vehicle to the expected temperature.

In another aspect, the subject matter may be embodied in a method for controlling a temperature within a vehicle. The method includes obtaining, by a processor and from one or more sensors, an amount of sunload energy. The method includes obtaining, by a processor and from memory, a blower map from a multiple blower maps based on the amount of sunload energy. The method includes determining, by the processor, an airflow rate based on the blower map and an expected temperature. The method includes controlling, by the processor and using a HVAC unit, the airflow rate to adjust a temperature within the vehicle to the expected temperature.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems, vehicles and methods for improving the energy efficiency of a control system that manages the climate for a vehicle. Particular embodiments of the subject matter described in this specification may be implemented to realize one or more of the following advantages. The control system accounts for solar, sunload and/or thermal energy when adjusting the airflow within a vehicle to increase energy efficiency. When the vehicle is stopped and the engine is off, there is a limited amount of energy that remains to power a blower or fan to blow air throughout the vehicle before the engine must turn back on to provide energy to power the blower or fan. For example, when the vehicle has a start-stop system that turns off the engine when the vehicle is stopped, if the vehicle remains idle for a significant amount of time with the air conditioning running, the engine may restart to provide additional energy to power the blower or fan in response to rising temperatures within the vehicle. The control system obtains solar, sunload and/or thermal energy information and uses the solar, sunload and/or thermal energy information to control the speed of the fan or blower to control airflow rate. This optimizes the performance of the fan or blower to maintain the desired temperature by use of lower blower levels during stops for certain conditions which results in increased fuel efficiency of the vehicle as the engine does not need to restart to provide additional power, as often, when using either the heater to warm the vehicle or the air conditioner to cool the vehicle.

Other benefits and advantages include the ability to account for the use of other devices, such as seat ventilation, and/or control the other devices when adjusting the temperature within the vehicle to the desired comfort level. For example, if the seat warmer is on, the control system may need to blow less hot air into the cabin of the vehicle to keep the temperature within the cabin of the vehicle at a desired temperature. By spinning the blower or the fan at a lower rate, the control system consumes less energy, which reduces the amount of fuel converted into the energy and improves the fuel efficiency of the vehicle.

Figure 1:
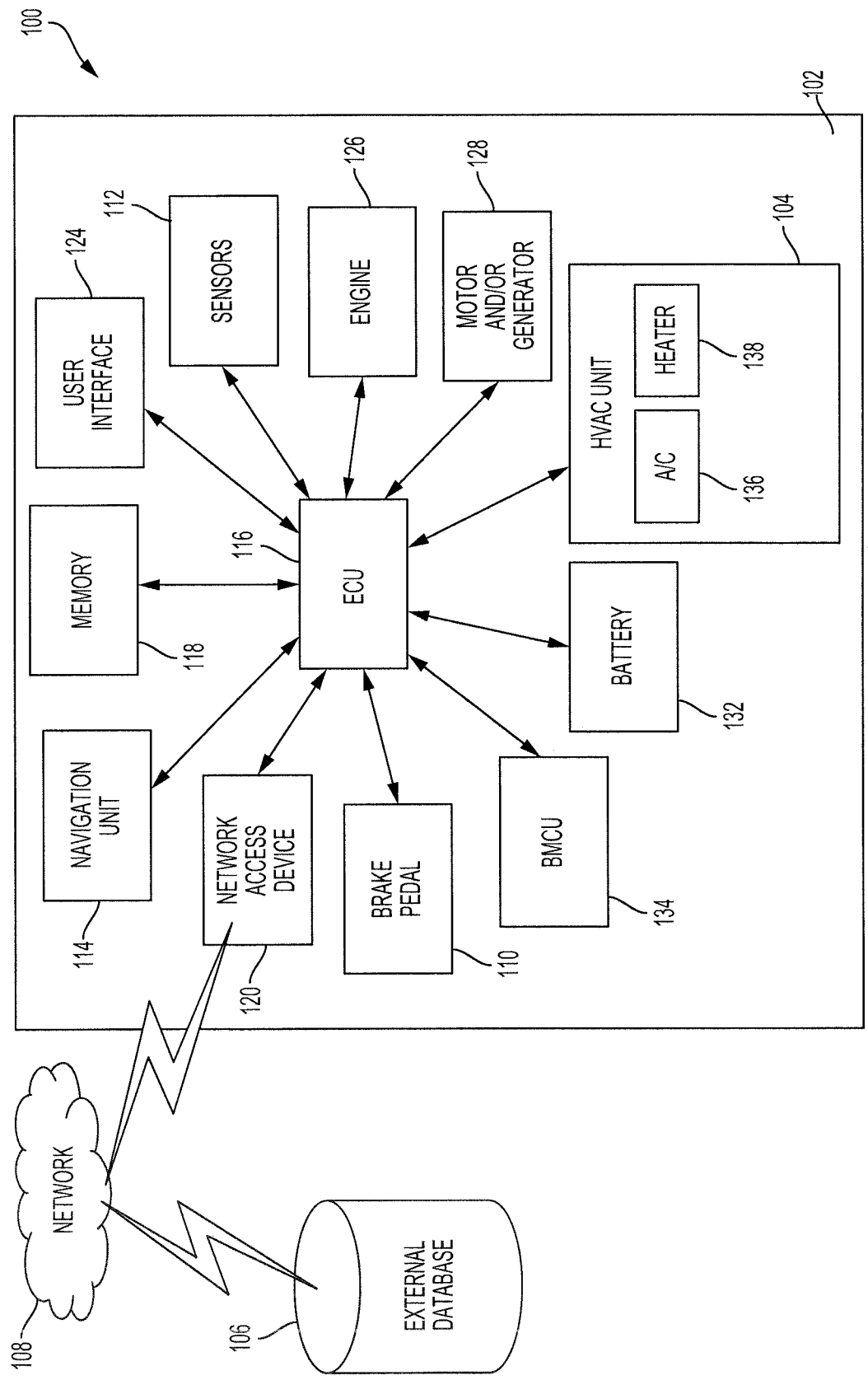
FIG. 1 is a block diagram of an example control system according to an aspect of the invention.

FIG. 1 is a block diagram of the control system 100. The control system 100 controls the heating, ventilation and air conditioning (HVAC) unit 104 to provide comfort to occupants of the vehicle 102 while improving fuel efficiency of the vehicle 102. The control system 100 manages the air conditioner 136 and/or the heater 138 to more efficiently control a temperature within the vehicle 102. The control system 100 may adjust, control and/or operate a blower or fan to adjust the temperature and comfort level within the vehicle 102.

The control system 100 may include a vehicle 102, one or more external databases 106. In some implementations, the control system 100 is a separate device from the vehicle 102 and/or the one or more external databases 106, and instead, connects to, is included in or is retro-fitted to the vehicle 102 and/or the one or more external databases 106. For example, the control system 100 may connect to or be retro-fitted to the vehicle 102 and wirelessly connect to the one or more external databases 106 through a network 108. The control system 100 includes any or all of the vehicle components of the vehicle 102 and/or interacts with the vehicle components of the vehicle 102.

A vehicle, e.g., vehicle 102, is a conveyance capable of transporting a person or persons or any material or any permanently or temporarily affixed apparatus. The vehicle may be a self-propelled wheeled conveyance, such as a car, a truck, a bus, a van or other motor and/or battery driven vehicle. For example, the vehicle 102 may be an electric vehicle, a hybrid vehicle, or a plug-in hybrid vehicle. Other examples of vehicles include bicycles, trains, planes, or boats, and any other form of conveyance that is capable of transportation. The vehicle may be a semi-autonomous or an autonomous vehicle. That is, the vehicle 102 may be self-maneuvering and capable of sensing the environment and navigating without human input. An autonomous vehicle may use one or more sensors, e.g., the one or more sensors 112, and a navigation unit, e.g., the navigation unit 114, to drive autonomously.

The one or more external databases 106 may include databases from different service providers. A service provider may provide information to the vehicle 102, such as navigational map information, weather information, or other information. The information may be stored in the one or more external databases 106.

A database is any collection of pieces of information that is organized for search and retrieval, such as by a computer, and the database may be organized in tables, queries, schemas, queries, report, or any other data structures. A database may use any number of database management systems. An external database 106 may include a third-party server or website that stores or provides information. The information may be real-time information, updated periodically, or user-inputted. A server may be a computer in a network that is used to provide services, such as accessing files or sharing peripherals, to other computers in the network. A website may be a collection of one or more resources associated with a domain name.

Navigational map information may include locations of physical geographic features, such as hills, mountains, rivers and forests, and/or road features, such as highways, on-ramps, off-ramps, bridges, railroad crossings and toll roads. Weather information includes one or more weather features. The weather features include real-time and/or predicted temperatures for a particular location at a particular time of day. The weather features may include the time for sunset, sunrise, and/or peak time. The weather features may include an amount of precipitation and/or humidity in the air at a particular location at a particular time. Other weather features may include an amount of cloud cover or wind.

Features, e.g., terrain features, road features, or weather features, each have a location that may be identified by map coordinates. The navigational map information and/or weather information may include the map coordinates associated with the features. Map coordinates include latitude and longitudinal coordinates.

The control system 100 may be a separate device from the vehicle 102, and/or the one or more external databases 106. The control system 100 and/or the vehicle 102 may connect to the one or more external databases 106 through a network 108. The network 108, such as a local area network (LAN), a wide area network (WAN), a cellular network, the Internet, or a combination thereof, may connect the vehicle 102 and/or the control system 100 to the one or more external databases 106.

Figure 6:
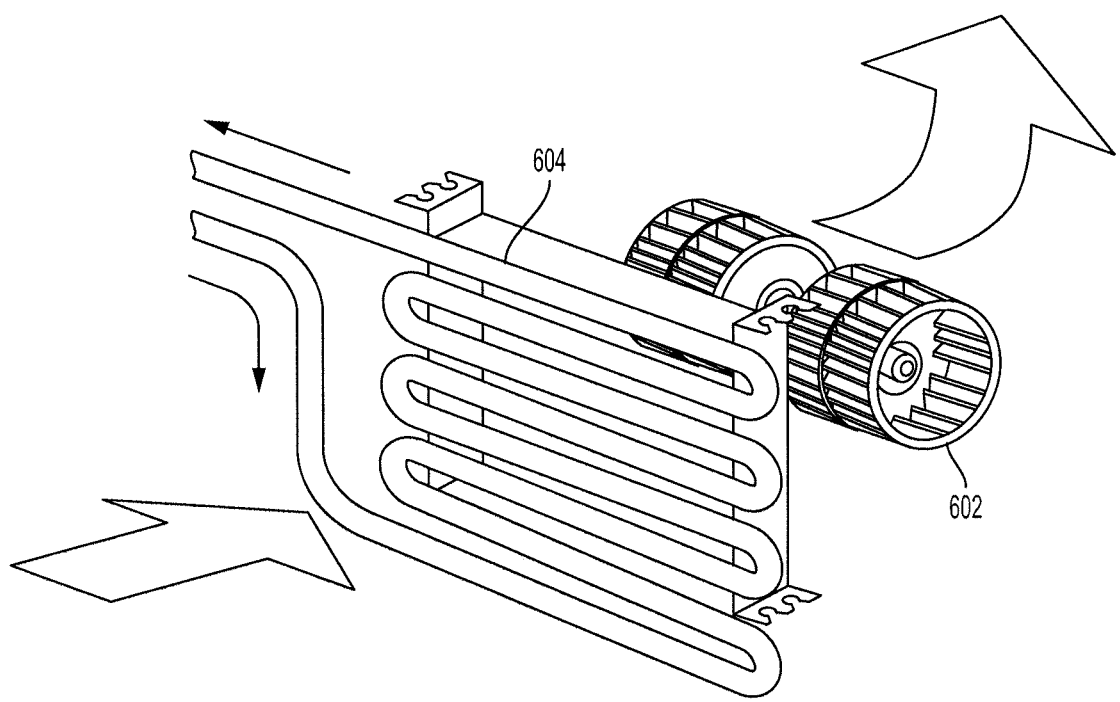
FIG. 6 shows an example air conditioner of the control system of FIG. 1 according to an aspect of the invention.
Figure 7:
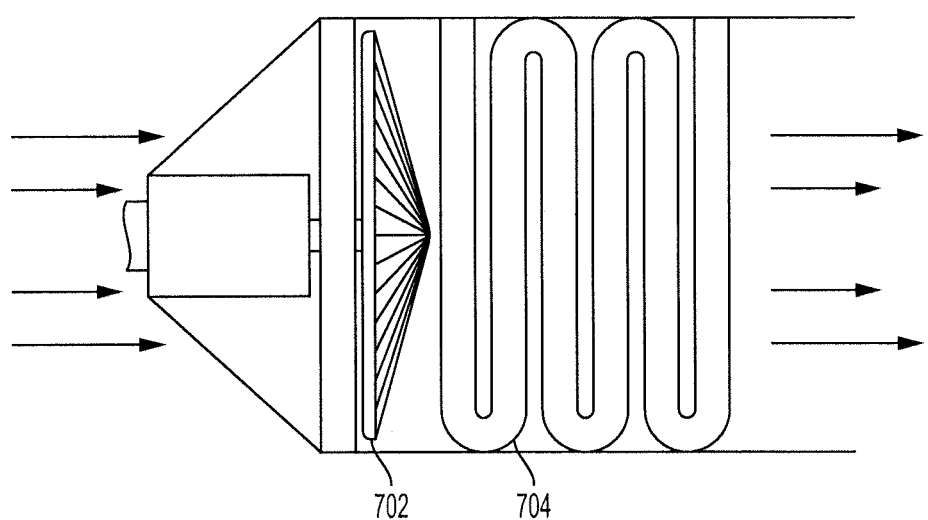
FIG. 7 shows an example heater of the control system of FIG. 1 according to an aspect of the invention.

The control system 100 includes a processor, such as an electronic control unit (ECU) 116, that is programmed to control the speed of the blower or the fan of the HVAC unit 104. The control system 100 includes a HVAC unit 104, a memory 118, one or more sensors 112 and/or a network access device 120. The HVAC unit 104 may include an air conditioner 136 and/or a heater 138. The air conditioner 136 and/or the heater 138 have one or more air control devices, such as a blower 602 or a fan 702. The air conditioner 136 and/or the heater 138 may use the same air control device or different air control devices. The air conditioner 136 has a blower 602 to move the air through the evaporator 604 to cool the cabin of the vehicle 102, as shown in FIG. 6, for example. The heater 138 may have a fan 702 to move the air through the heating core 704 to heat the cabin of the vehicle 102 or pass through a defroster to warm a window, as shown in FIG. 7, for example.

The control system 100 may include a navigation unit 114 and/or a user interface 124. The control system 100 and/or the vehicle 102 may include an engine 126, a motor and/or generator 128, a brake pedal 110, a battery 132 and/or a battery management control unit (BMCU) 134.

The motor and/or generator 128 may convert electrical energy into mechanical power, such as torque, and may convert mechanical power into electrical energy. The motor and/or generator 128 may be coupled to the battery 132. The motor and/or generator 128 may convert the energy from the battery 132 into mechanical power, and may provide energy back to the battery 132, for example, via regenerative braking. In some implementations, the vehicle 102 may include one or more additional power generation devices such as the engine 126 or a fuel cell stack (not shown). The engine 126 combusts fuel to provide power instead of and/or in addition to the power supplied by the motor and/or generator 128. The control system 100 may use the power and/or energy to power the HVAC unit 104.

The battery 132 may be coupled to the motor and/or generator 128 and may provide electrical energy to and receive electrical energy from the motor and/or generator 128. The battery 132 may include one or more rechargeable batteries.

The BMCU 134 may be coupled to the battery 132, and may control and manage the charging and discharging of the battery 132. The BMCU 134, for example, may measure, using battery sensors, parameters used to determine the state of charge (SOC) of the battery 132. The BMCU 134 may control the battery 132 to maintain a reserve power for powering a blower and/or a fan of the air conditioner 136 and/or the heater 138, respectively, while the vehicle 102 is stopped. The blower and/or the fan of the air conditioner 136 and/or the heater 138 may be the same airflow device or may be different airflow devices.

The ECU 116 may be electrically coupled to some or all of the components of the vehicle 102. The ECU 116 may include one or more processors or controllers specifically designed for automotive systems, and the functions of the ECU 116 may be implemented in a single ECU or in multiple ECUs. The ECU 116 may receive data from one or more components and control the operation of one or more components based on the received or determined data. For example, the ECU 116 may receive data from a navigation unit 114, one or more sensors 112, and/or a network access device 120 and integrate the data received from each of the devices to output a display on a user interface 124. The ECU 116 may determine when to control the airflow rate through the HVAC unit 104. The ECU 116 may control the operations of the BMCU 134 to charge or discharge the battery 132 to power the HVAC unit 104 even when the vehicle 102 is stopped.

The memory 118 may be coupled to the ECU 116. The memory 118 may store instructions to execute on the ECU 116 and may include one or more of a random access memory (RAM) or other volatile or non-volatile memory. The memory 118 may be a non-transitory memory or a data storage device, such as a hard disk drive, a solid-state disk drive, a hybrid disk drive, or other appropriate data storage. The memory 118 may further store machine-readable instructions, which may be loaded and executed by the ECU 116 to control the speed of the fan or the blower of the HVAC unit 104. The memory 118 may store multiple blower maps that correspond to different threshold or ranges of solar, sunload and/or thermal energy. The blower maps associate airflow rates with a temperature and/or target airflow or an evaporator temperature.

The ECU 116 may be coupled to one or more sensors 112 that detect various internal or external environmental parameters. For example, a temperature sensor may measure an ambient temperature within the vehicle 102 or outside and surrounding the vehicle 102. In another example, a brake pedal sensor may detect and/or measure an amount of pressure applied to the brake pedal 110 of the vehicle 102. In another example, a humidity sensor may detect an amount of humidity within the air inside the vehicle 102 or outside the vehicle 102. In another example, a sunload sensor may measure an amount of sunlight directed at the vehicle.

The navigation unit 114 may include a Global Position System (GPS) unit (not shown) for detecting location data and date/time information. The navigation unit 114 may provide navigation instructions based on detected location data and may include a memory (not shown) for storing route data. The navigation unit 114 may obtain navigational map information from the one or more external databases 106, vehicle information, such as a current location or a speed of the vehicle 102, and/or weather information, such as the temperature at a particular location.

The navigation unit 114 may be integral to the vehicle 102 or a separate unit coupled to the vehicle 102, or may be separate from the vehicle 102, such as a personal device with navigation capability. When the navigation unit 114 is separate from the vehicle 102, the navigation unit 114 may communicate with the vehicle 102 via the network access device 120. In some implementations, the vehicle 102 may include a GPS unit instead of the navigation unit 114. In that regard, the ECU 116 may perform the functions of the navigation unit 114 based on data received from the GPS unit. At least one of the navigation unit 114 or the ECU 116 may predict or propose a route set that includes a starting location and a destination location. The navigation unit 114 or the ECU 116 may perform navigation functions. Navigation functions may include, for example, route and route set predictions, providing navigation instructions, and receiving user input such as verification of predicted routes and route sets or destinations.

The navigation unit 114 may include a user interface separate from the user interface 124 and/or may communicate via the user interface 124. The user interface 124 may be a vehicle display or a personal device, e.g., a mobile phone, a tablet, a personal computer, which is connected to the ECU 116 through the network access device 120 across a network 108. The user interface 124 may include any device capable of receiving user input, such as a button, a dial, a microphone, or a touch screen, and any device capable of output, such as a display, a speaker, or a refreshable braille display. The user interface 124 allows a driver or a passenger of the vehicle 102 to communicate with the ECU 116. For example, the driver may be able to provide data to the ECU 116 and/or receive feedback from the ECU 116 via the user interface 124.

The network access device 120 may include a communication port or channel, such as one or more of a Wi-Fi unit, a Bluetooth® unit, a radio frequency identification (RFID) tag or reader, or a cellular network unit for accessing a cellular network (such as 3G or 4G). The network access device 120 may transmit data to and receive data from devices and systems not directly connected to the vehicle 102. For example, the ECU 116 may communicate with the external databases 106 via the network 108.

Figure 2:
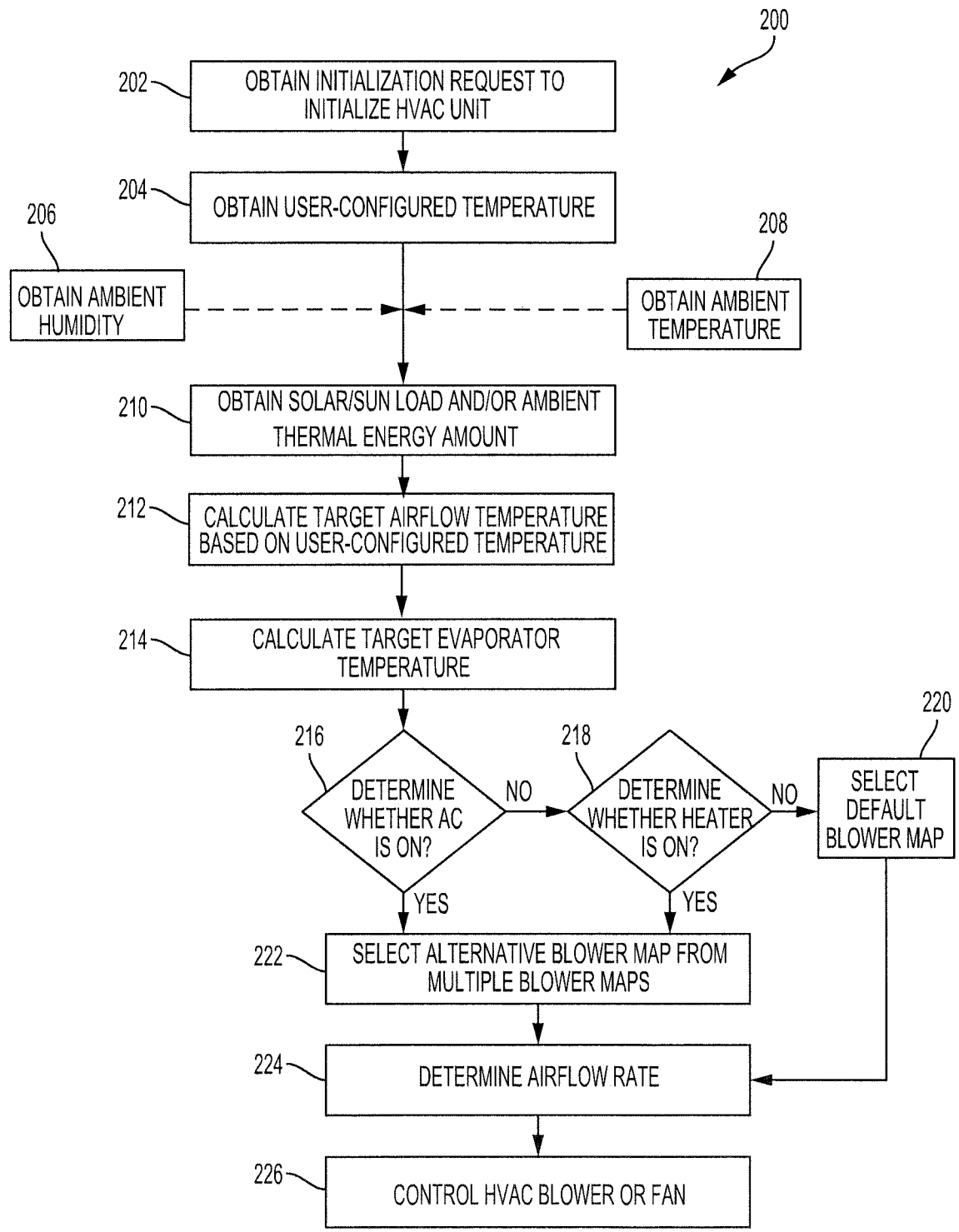
FIG. 2 is a flow diagram of an example process for controlling and/or adjusting the airflow rate or output from the HVAC unit into the cabin of the vehicle using the control system of FIG. 1 according to an aspect of the invention.

FIG. 2 describes the process 200 for controlling and/or adjusting the airflow rate or output from the HVAC unit 104 into the cabin of the vehicle 102. One or more computers or one or more data processing apparatuses, for example, the ECU 116 of the control system 100 of FIG. 1, appropriately programmed, may implement the process 200.

The control system 100 may obtain an initialization request, such as via user input through the user interface 124, which initializes the HVAC unit 104 (202). When the HVAC unit is initialized, the fan or blower of the HVAC unit is on and rotates to provide air into the cabin of the vehicle. For example, user input, such as the depression of a button or user interface element on the user interface 124, may turn on the fan or blower of the air conditioner 136 or heater 138, respectively. In some implementations, the control system 100 may initialize automatically when the temperature of the cabin of the vehicle 102 is either less than or greater than the user-configured temperature. The control system 100 may initialize the HVAC unit 104 for multi-zone climate control. When the HVAC unit 104 is initialized for multi-zoned climate control, the control system 100 may control the HVAC unit 104 independently for each zone of the cabin of the vehicle 102 or have independent HVAC units. Thus, each zone of the cabin may have a different temperature setting, which the control system 100 may determine independently. Moreover, the control system 100 controls the airflow rate independently for each zone to adjust and/or control the temperature within each of the zones.

Figure 8:
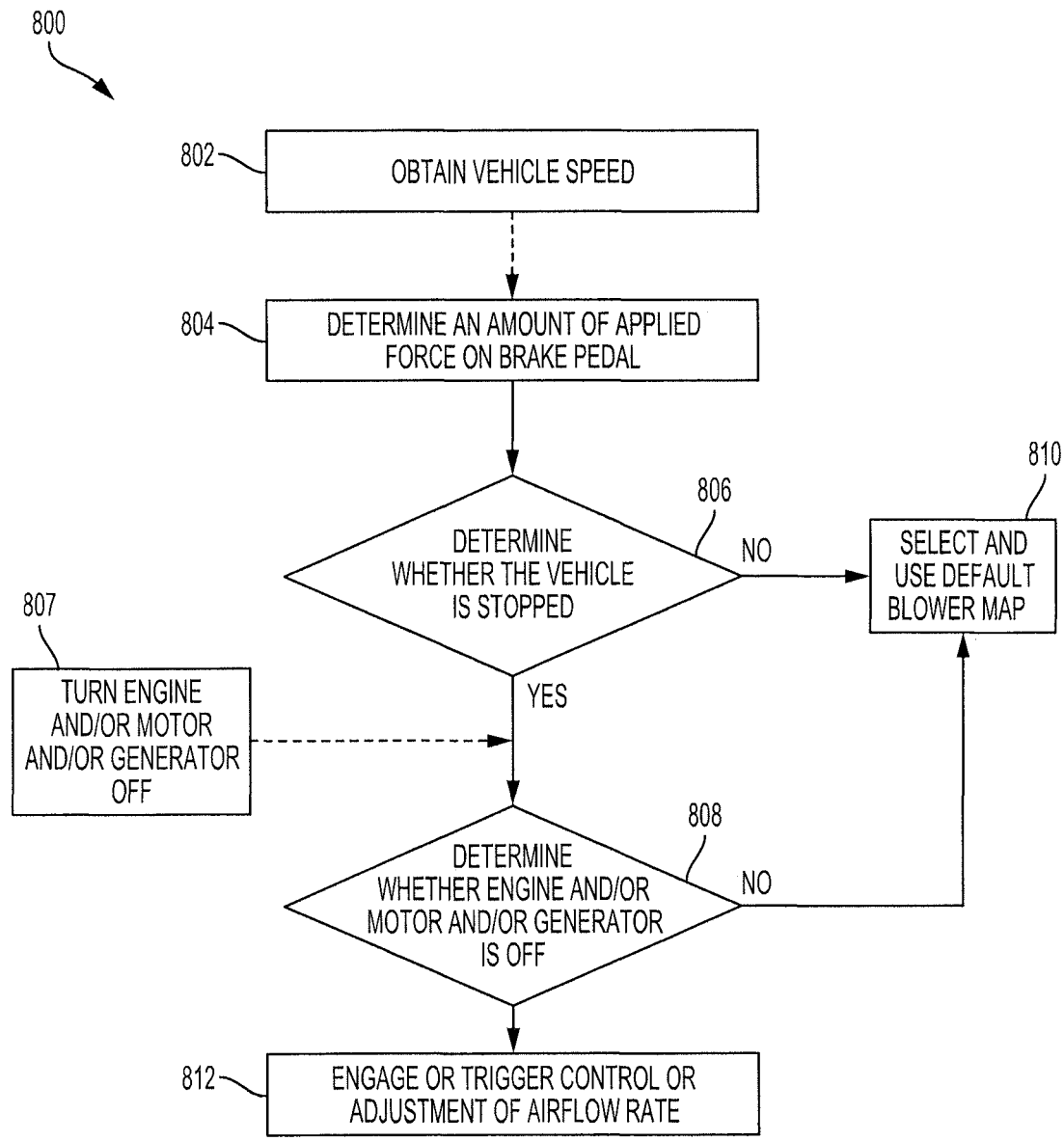
FIG. 8 is a flow diagram of an example process for triggering and/or engaging the adjustment and/or control of the airflow rate by the control system of FIG. 1 according to an aspect of the invention.

In some implementations, the control system 100 activates or initializes the HVAC unit 104 when another device is activated. For example, when an occupant turns on the defroster, the control system 100 may initialize the HVAC unit 104. The control system 100 may activate or initialize as part of the start-stop feature of the vehicle 102 and engage and/or activate when the vehicle 102 is stopped and/or the engine 126 or the motor and/or generator 128 is off. FIG. 8 further describes the activation when the vehicle 102 is stopped.

The control system 100 may obtain a user-configured temperature via user input through the user interface 124 or detect an identity of an occupant using one or more sensors 112, such as a camera, and associate the identity to a user profile with the user-configured temperature (204). The control system 100 may capture the user-configured temperature in either in degrees Fahrenheit or Celsius. The control system 100 may store the user profile that has the user-configured temperature for the occupant in the memory 118 and retrieve the user profile for the occupant from the memory 118. The control system 100 may retrieve the user profile when the vehicle 102 is activated, such as when an ignition sensor indicates that the ignition has been activated.

The control system 100 may obtain the ambient humidity of the air within the cabin of the vehicle 102 and/or humidity of the air outside the vehicle 102 (206). The control system 100 may measure and/or detect an amount of humidity in the air and use the amount of humidity to determine a target airflow temperature for the air within the cabin of the vehicle 102. A sensor, such as a hygrometer, may measure and/or detect humidity within the air.

The control system 100 may measure and/or detect an ambient temperature within the vehicle 102 and/or outside the vehicle 102 using one or more sensors 112, such as a temperature sensor or thermometer (208). In some implementations, the control system 100 may access one or more external databases 106 and provide the one or more external databases 106 with a current location of the vehicle 102 to obtain the ambient temperature outside the vehicle 102. The control system 100 may query the one or more external databases 106 with the current location of the vehicle 102 and obtain weather information that includes the ambient temperature outside the vehicle 102 from the one or more external databases 106. The navigation unit 114 may obtain the current location of the vehicle 102 to provide to the one or more external databases 106. The control system 100 may use the network access device 120 to connect to the one or more external databases 106 via the network 108.

Figure 3:
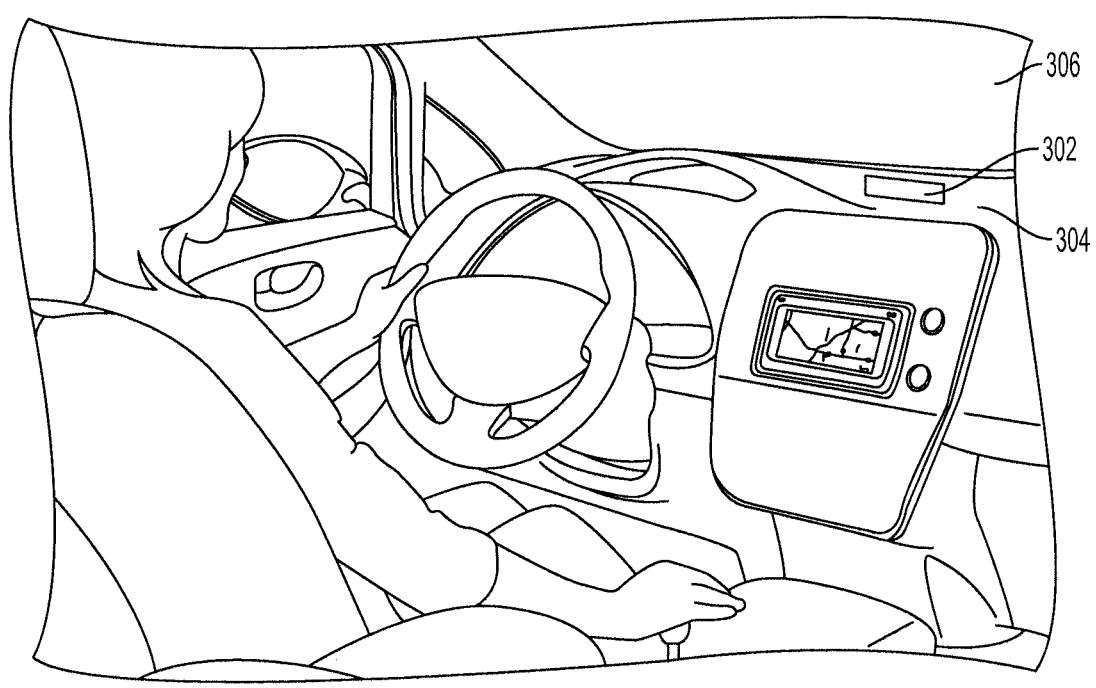
FIG. 3 shows an example sensor for detecting the solar or sunload of the control system of FIG. 1 according to an aspect of the invention.

The control system 100 obtains a solar, sunload and/or ambient thermal energy amount that is directed at and/or within the vehicle 102 (210). The control system 100 may use one or more sensors 112 that are positioned near or in proximity to the front windshield 306 or other window, as shown in FIG. 3 for example. For example, the thermal sensor 302 may be positioned on the dashboard 304 of the vehicle 102.

The one or more sensors 112 may measure the amount of solar energy, sunload energy and/or ambient thermal energy that is directed at and/or within the vehicle 102 and provide the measured amount to the ECU 116 so that the control system 100 may adjust or control the temperature and comfort level within the vehicle 102. The one or more sensors 112 may measure the amount of thermal energy radiated within the vehicle 102.

The control system 100 may calculate a target airflow temperature (212). The control system 100 may use the user-configured temperature to calculate the target airflow temperature. The control system 100 may use the calculated target airflow temperature to control a blower or a fan that blows air through or across an evaporator or a heating core to either cool or heat, respectively, the air within the cabin of the vehicle 102. By adjusting the user-configured temperature, an occupant controls the comfort level and the temperature of the air that exits the HVAC unit 104 into the cabin of the vehicle 102. In some implementations, the control system 100 may calculate the target airflow temperature based on one or more of the obtained information, such as the user-configured temperature, the ambient temperature and/or ambient humidity of the air and/or the solar, sunload and/or thermal energy amount.

The control system 100 calculates and/or determines a target evaporator temperature based on the obtained information including the user-configured temperature, the ambient temperature, the ambient humidity, the solar, sunload and/or ambient thermal energy within or surrounding the vehicle 102 (214). The target evaporator temperature may be a weighted average of the different factors. The evaporator temperature is the temperature of the air as the air exits the evaporator of the air conditioner. The control system 100 controls the speed of the blower or the fan of the HVAC unit 104 to manage the airflow rate or volume that passes through the air conditioner 136 and/or the heater 138 based on the target airflow temperature. When the ambient temperature is either hot or cold, the target airflow temperature may be set to a more extreme or severe hot or cold temperature. When the ambient temperature is mild, the target airflow temperature may be less severe.

The control system 100 determines whether the air conditioner 136 is on (216) and/or the heater 138 is on (218). The control system 100 may determine that the air conditioner 136 and/or the heater 138 is on, off or set to automatic based on user input that includes an indicator for the air conditioner 136 or an indicator for the heater 138, respectively. If the indicator for the air conditioner 136 or the heater 138 is set to the automatic state, the control system 100 controls the air conditioner or the heater automatically based on the temperature within the cabin of the vehicle 102.

The air conditioner 136 may be on, off or transition between on and off based on the temperature within the vehicle 102 and the user-configured temperature. If the indicator for the air conditioner 136 is in the on state, the control system 100 may determine that the air conditioner 136 is on. If the indicator for the air conditioner is in the off state, the control system 100 may determine that the air conditioner 136 is off. If the indicator for the air conditioner 136 is in the automatic state, the control system 100 may turn on the air conditioner 136 when the temperature within the cabin of the vehicle 102 is greater than a user-configured temperature. Otherwise, when the indicator for the air conditioner 136 is in the automatic state and the temperature within the cabin of the vehicle 102 is less than or equal to the user-configured temperature, the control system 100 may turn off the air conditioner 136.

Similarly, the heater 138 may be on, off or transition between on and off based on the temperature within the vehicle 102 and the user-configured temperature. If the indicator for the heater 138 is in the on state, the control system 100 may determine that the heater 138 is on. If the indicator for the heater 138 is in the off state, the control system 100 may determine that the heater 138 is off. If the indicator for the heater 138 is in the automatic state, the control system 100 may turn on the heater 138 when the temperature within the cabin of the vehicle 102 is less than a user-configured temperature. Otherwise, when the indicator for the heater 138 is in the automatic state and the temperature within the cabin of the vehicle 102 is greater than or equal to a user-configured temperature, the control system 100 may turn off the heater 138.

Figure 5:
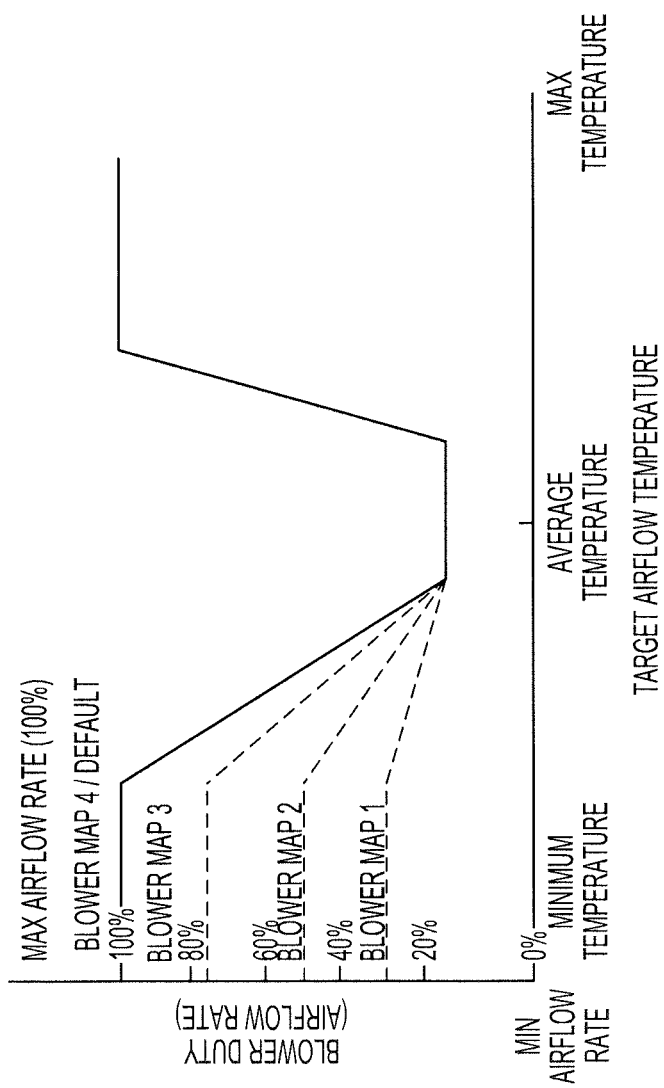
FIG. 5 is an example graph showing the relationship of different blower maps used by the control system of FIG. 1 according to an aspect of the invention.

If the heater 138 and/or the air conditioner 136 is off, the control system 100 selects a default blower map from multiple blower maps to control the fan or the blower (220). When the heater 139 and/or the air conditioner 136 is off and the HVAC unit 104 is activated, the air conditioner compressor is not selected to cool the cabin of the vehicle and the airflow is not directed through the heater core to heat the cabin of the vehicle, while the HVAC unit 104 may still be activated to provide ventilation and/or circulation. And so, the control system 100 uses and selects the default blower map to control the airflow rate. For example, the fan or the blower of the HVAC unit 104 may provide ventilation or air circulation, even though the air conditioner 136 and the heater 138 are off. A blower map associates and/or maps an airflow rate or volume with the target airflow temperature, as shown in FIG. 5, for example.

Figure 4:
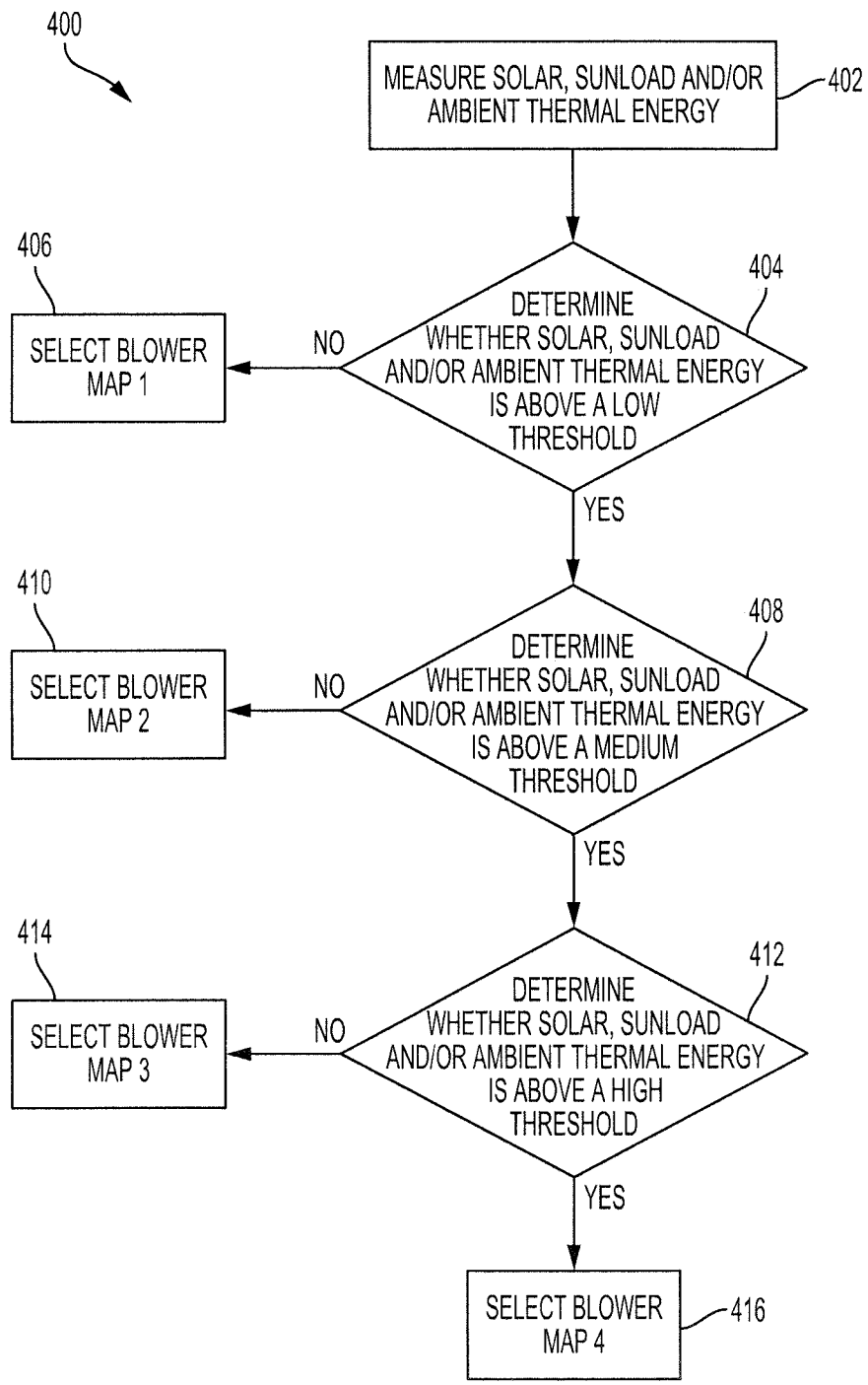
FIG. 4 is flow diagram of an example process for selecting an alternative blower map according to an aspect of the invention.

If the heater 138 and/or the air conditioner is on, the control system selects an alternative blower map from the multiple blower maps based on the obtained information (222). The obtained information includes the user-configured temperature, the ambient temperature, the ambient humidity, the solar, sunload and/or ambient thermal energy within or surrounding the vehicle 102. FIG. 4 further describes the selection of the alternative blower map. By using alternative blower maps instead of the default blower map, the control system 100 may require less energy or power to rotate the fan or the blower of the heater 138 or air conditioner 136, respectively, to adjust or control the temperature within the vehicle 102 to the user-configured temperature. Thus, the control system 100 reduces the amount of energy needed for the temperature to reach the user-configured temperature and provides approximately the same amount of comfort to the occupants of the vehicle 102. This improves the fuel and/or electrical energy efficiency of the vehicle 102.

The control system 100 may improve the fuel efficiency and/or electrical energy efficiency of the vehicle 102 when the vehicle 102 is stopped. For example, when the engine 126 is off, the control system 100 may use the alternative blower maps to prolong the amount of time the engine 126 remains off before restarting to provide power to cool and/or heat the vehicle 102 while providing an equivalent level of comfort to the occupants of the vehicle 102. Moreover, the control system 100 minimizes the use of the refrigerant or phase-change material in the evaporator and/or coolant in the heating core. The control system 100 may also reduce energy usage by a compressor, such as by the electrical compressor in an electric vehicle that powers the air conditioner. FIG. 8 describes the process 800 where the control system engages control of the HVAC blower and/or fan using the blower maps when the vehicle 102 is stopped.

The control system 100 determines an airflow rate based on the selected blower map and the target airflow temperature (224). The control system 100 may map the calculated target airflow temperature to an airflow rate or volume using the selected blower map, as shown in FIG. 5, for example. In some implementations, the airflow rate may be based on at least one of the target airflow temperature, the target evaporator temperature or both.

Once the control system 100 determines the airflow rate, the control system 100 controls and/or adjusts the fan or the blower to output air into the cabin of the vehicle 102 based on the airflow rate (226). For example, the control system 100 may adjust a speed of the fan 702 of the heater 138 to adjust the temperature within the vehicle 102 to the user-configured temperature. In another example, the control system 100 may adjust a speed of the blower 602 of the air conditioner 136 to adjust the temperature within the vehicle 102 to the user-configured temperature. By adjusting the speed of the blower 602 or the fan 702 using the airflow rate that was selected from one of the alternative blower maps, the control system 100 reduces the amount of energy required to power the blower 602 or the fan 702 and reduces the amount of refrigerant, phase-change material and/or coolant used to achieve the same or approximately the same temperature.

FIG. 4 describes the process 400 for controlling and/or adjusting the airflow rate that flows through the evaporator to cool the cabin of the vehicle 102 using the air conditioner 136. One or more computers or one or more data processing apparatuses, for example, the ECU 116 of the control system 100 of FIG. 1, appropriately programmed, may implement the process 400.

The control system 100 measures an amount of solar, sunload and/or ambient thermal energy to determine the alternative blower map from the multiple blower maps to select and use to control the airflow rate (402). Other obtained information may be compared to one or more threshold values to determine which alternative blower map to select and use to control the airflow rate. The other obtained information may include the user-configured temperature, the ambient temperature, and/or the ambient humidity.

The control system 100 may use one or more sensors, such as the thermal sensor, to measure the solar, sunload and/or ambient thermal energy. In some implementations, the control system 100 may obtain weather information including the amount of solar, sunload and/or ambient thermal energy at a particular location from the one or more external databases 106.

The control system 100 may determine whether the amount of solar, sunload and/or ambient thermal energy (or "sunload value") is greater than or equal to a low threshold (404). The low threshold may be approximately 200 W/m$^2$, 300 W/m$^2$, or 400 W/m$^2$, for example. If the sunload value is less than the low threshold, the control system 100 may select a first blower map that corresponds to a low range (406).

For example, when the sunload value is at a minimum, such as within a low range between 0 and 200 W/m$^2$, the control system 100 may select a corresponding first blower map for the low range. The first blower map may limit the airflow rate to within a range, such as within a range that is limited to approximately 25% of the maximum rate as shown in FIG. 5, for example. The first blower map may have a range of airflow rates that are slower than the range of airflow rates for another blower map associated with a medium range, a high range or a default blower map. The range of airflow rates may be between 0-25% of the maximum rate for the first blower map, for example. By spinning the blower 602 at the slower rate, the HVAC unit 104 uses less fuel and/or electrical energy to achieve the same temperature. Moreover, the blower 602 of the air conditioner 136 evaporates less refrigerant and/or less phase-change material, such as a cooling wax, when the air passes across or through the evaporator 604. Thus, the engine 126 or the motor and/or generator 128 does not need to restart for a longer period of time and may remain off without consuming any fuel and/or the battery 132 does not need to provide a state of charge to power a compressor to provide more refrigerant and/or phase-change material through the evaporator 604.

If the control system 100 determines that the sunload value is greater than or equal to a low threshold, the control system 100 may determine whether the sunload value is greater than or equal to a medium threshold (408). The medium threshold may be approximately 600 W/m$^2$, 700 W/m$^2$, or 750 W/m$^2$, for example, which is greater than the low threshold. If the control system 100 determines that the sunload value is greater than or equal to the low threshold and less than the medium threshold, the control system 100 may select a second blower map that corresponds to a medium range (410). The second blower map may limit airflow rates to within a range. The range may be limited to 50% of the maximum rate of the blower, as shown in FIG. 5 for example. The second blower map may have a range of airflow rates that are slower than the range of airflow rates for another blower map associated with a high range or a default blower map but at a faster rate than for a blower map associated with the low range. The range of airflow rates may be between 0-50% of the maximum rate for the second blower map, for example.

If the control system 100 determines that the sunload value is greater than or equal to the medium threshold, the control system may determine whether the sunload value is greater than or equal to a high threshold (412). The high threshold may be approximately 1000 W/m$^2$, for example, which is greater than the low and medium thresholds. If the control system 100 determines that the sunload value is greater than or equal to the medium threshold and less than the high threshold, the control system 100 may select a third blower map that corresponds to a high range (414). The third blower map may have a range of airflow rates that is limited to 75% of the maximum rate, for example. The third blower map may have a range of airflow rates that are slower than for another blower map associated with a range above the high range or a default blower map but at a faster rate than for a blower map associated with the low range or the medium range. The range of airflow rates may be between 0-75% of the maximum rate for the third blower map, for example.

If the control system 100 determines that the sunload value is greater than or equal to the medium threshold and the high threshold, the control system 100 may select a fourth blower map that corresponds to a range above the high range (416). The fourth blower map may have a range of airflow rates that is the fastest and is limited by only the maximum rate. The range of airflow rates may be between 0-100% of the maximum rate for the fourth blower map, for example. The fourth blower map may be the default blower map.

The speed of the blower 602 of the air conditioner 136 and the corresponding airflow rates may be directly related to the sunload value. That is, as the sunload value increases, the control system 100 selects blower maps with a higher overall range of airflow rates, and as the sunload value decreases, the control system 100 selects blower maps with a lower overall range of airflow rates to increase or decrease the speed of the blower 602 and the airflow rate, respectively, through the evaporator. The control system 100 increases the speed of the blower to achieve a faster airflow rate and decreases the speed of the blower to achieve a slower airflow rate.

The control system 100 may apply different alternative blower maps to control the speed of the fan 702 of the heater 138. The speed of the fan 702 of the heater 138 may be inversely related to the sunload value. That is, as the sunload value increases, the control system 100 selects blower maps with lower airflow rates, and as the sunload value decreases, the control system 100 selects blower maps with higher airflow rates to decrease or increase the speed of the fan 702 and the airflow rate, respectively, through the heating core 704 to achieve the same or approximately the same temperature within the vehicle 102. This reduces the amount of fuel and/or electrical energy usage. Since the fan 702 moves less air, the air extracts less heat from the coolant in the heating core 704 so the control system 100 may use less energy to reheat the coolant in the heating core 704. Thus, the engine 126 or the motor and/or generator 128 does not need to restart for a longer period of time and may remain off without consuming any fuel and/or the battery 132 does not need to provide a state of charge to provide more coolant through the heating core 704.

FIG. 8 describes the process 800 for engaging and/or triggering the control or adjustment of the airflow rate of the HVAC unit of the control system of FIG. 1 to improve fuel efficiency. One or more computers or one or more data processing apparatuses, for example, the ECU 116 of the control system 100 of FIG. 1, appropriately programmed, may implement the process 800.

The control system 100 may trigger and/or engage the control or adjustment of the airflow rate to maintain the comfort level of the occupants when the vehicle 102 is stopped. For example, the control system 100 may trigger and/or engage the control or adjustment as part of a start-stop system of the vehicle 102 and/or in response to the vehicle 102 being stopped.

The control system 100 may obtain or determine the speed of the vehicle 102 (802). The control system 100 may use one or more sensors 112, such as a vehicle speed sensor, to detect and/or measure the speed of the vehicle 102. In some implementations, the control system 100 may use the navigation unit 114 to obtain a current location of the vehicle 102 at different times and the ECU 116 to calculate the speed based on the location of the vehicle 102 at the different times and the elapsed time(s).

The control system 100 may determine an amount of applied force on the brake pedal 110 (804). The control system 100 may use one or more sensors 112, such as a brake pedal sensor, to detect and/or measure the amount of applied force on the brake pedal 110.

The control system 100 determines whether the vehicle 102 is stopped based on the applied force on the brake pedal 110 and the speed of the vehicle 102 (806). If the amount of applied force is greater than or equal to a threshold value and/or the speed of the vehicle 102 is less than or equal to a threshold value, such as 0 mph, the control system 100 may determine that the brake pedal 110 is depressed and that the vehicle 102 is stopped. In response, the control system 100 may check the status of the engine 126 and/or the motor and/or generator 128. The control system 100 may turn the engine 126 or the motor and/or generator 128 off in response to determining that the vehicle 102 is stopped (807).

If the amount of applied force is less than the threshold value and/or the speed of the vehicle 102 is greater than the threshold value, the control system 100 may determine that the vehicle 102 is in motion. If the control system 100 determines that the vehicle 102 is in motion, the control system 100 selects the default blower map and controls the airflow rate using the default blower map (810). The default blower map may depend on whether the air conditioner 136 or the heater 138 is on.

The control system 100 may determine whether the engine 126 or the motor and/or generator 128 is off (808). The control system 100 may use one or more sensors 112, such as an engine sensor or a motor sensor, to detect and/or verify the state of the engine 126 or the motor and/or generator 128, respectively, and in particular, that the engine 126 or the motor and/or generator 128 is off. If the engine 126 or the motor and/or generator 128 is on, the control system 100 may select and use the default blower map to control the airflow rate (810). If the engine 126 is off and/or the motor and/or generator 128 is off, the control system 100 may engage or trigger the control or adjustment of the airflow rate, as described in FIGS. 2 and 4, for example, to improve fuel efficiency (812).

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A control system for a vehicle, comprising:
   one or more sensors configured to measure an amount of sunload energy;
   a heating, ventilation and air conditioning (HVAC) unit configured to output air with an airflow rate into a cabin of the vehicle;
   a memory configured to store a plurality of blower maps, each blower map of the plurality of blower maps being associated with different airflow rates with different temperature ranges within the cabin of the vehicle; and
   an electronic control unit connected to the one or more sensors and the HVAC unit and configured to:
      obtain an expected temperature that is within a temperature range,
      obtain, from the one or more sensors, the amount of sunload energy,
      obtain, from the memory, a blower map from the plurality of blower maps based on the amount of unload energy,
      determine the airflow rate based on the obtained blower map and the expected temperature, and
      control, using the HVAC unit, the airflow rate of the outputted air to adjust a temperature within the cabin of the vehicle to reach the expected temperature.

2. The control system of claim 1, wherein the one or more sensors include a vehicle speed sensor that is configured to measure a speed of the vehicle, wherein the electronic control unit is configured to determine, using the vehicle speed sensor, that the vehicle is stopped based on the speed of the vehicle.

3. The control system of claim 1, wherein the one or more sensors include an engine sensor that is configured to detect a state of an engine, wherein the electronic control unit is configured to:
   switch the state of the engine to an off state in response to determining that the vehicle is stopped, wherein to control, using the HVAC unit, the airflow rate to adjust the temperature is in response to the engine being in the off state.

4. The control system of claim 1, wherein to obtain, from the memory, the blower map from the plurality of blower maps based on the amount of sunload energy the electronic control unit is configured to:
   determine that the amount of sunload energy is within a first range of a plurality of ranges for the sunload energy or within a second range of the plurality of ranges for the sunload energy; and select a first blower map to obtain when the sunload energy is within the first range and select a second blower map to obtain when the sunload energy is within the second range.

5. The control system of claim 1, wherein the one or more sensors include an external sensor that measures an amount of sunlight directed at the vehicle and an internal sensor that measures an amount of thermal energy radiated within the vehicle, wherein the amount of sunload energy is a combination of the amount of sunlight directed at the vehicle and the amount of thermal energy radiated within the vehicle.

6. The control system of claim 1, wherein the electronic control unit is configured to:
obtain a user input;
calculate a target airflow temperature based on the user input;
calculate a target evaporator temperature; and
determine the expected temperature based on the calculated target airflow temperature and the target evaporator temperature.

7. The control system of claim 1, wherein to control, using the HVAC unit, the airflow rate to adjust the temperature to the expected temperature the electronic control unit is configured to:
determine that a heater or an air conditioner is on; and
increase or decrease the airflow rate through the heater or the air conditioner to increase or decrease the temperature.

8. A control system for a vehicle, comprising:
one or more sensors configured to measure an amount of thermal energy;
a heating, ventilation and air conditioning (HVAC) unit configured to output or circulate air having an airflow rate within the vehicle;
a memory for storing a plurality of blower maps that associate the airflow rate with an expected temperature and that includes a first blower map and a second blower map; and
a processor connected to the one or more sensors and the HVAC unit and configured to:
obtain, from the one or more sensors, the amount of thermal energy,
determine that the amount of thermal energy is within a first range of a plurality of ranges for the thermal energy or within a second range of the plurality of ranges for the thermal energy,
select the first blower map to obtain when the thermal energy is within the first range and the second blower map to obtain when the thermal energy is within the second range,
obtain, from the memory, the first blower map or the second blower map based on the selection,
determine the airflow rate based on the obtained first or second blower map and the expected temperature, and
increase or decrease, using the HVAC unit, the airflow rate to adjust a temperature within the vehicle to the expected temperature.

9. The control system of claim 8, wherein the one or more sensors include a vehicle speed sensor that is configured to measure a speed of the vehicle, wherein the processor is configured to determine, using the vehicle speed sensor, that the vehicle is stopped based on the speed of the vehicle.

10. The control system of claim 9, wherein the one or more sensors include an engine sensor that is configured to detect a state of an engine, wherein the processor is configured to:
switch the state of the engine to an off state in response to determining that the vehicle is stopped, wherein to increase or decrease, using the HVAC unit, the airflow rate to adjust the temperature is in response to the engine being in the off state.

11. The control system of claim 8, wherein the one or more sensors include an external sensor that measures an amount of sunlight directed at the vehicle and an internal sensor that measures an amount of the thermal energy radiated within the vehicle, wherein the amount of thermal energy is a combination of the amount of sunlight directed at the vehicle and the amount of thermal energy radiated within the vehicle.

12. The control system of claim 8, wherein the processor is configured to:
obtain a user input;
calculate a target airflow temperature based on the user input;
calculate a target evaporator temperature; and
determine the expected temperature based on the calculated target airflow temperature and the target evaporator temperature.

13. The control system of claim 8, wherein to increase or decrease, using the HVAC unit, the airflow rate to adjust the temperature within the vehicle to the expected temperature the processor is configured to:
determine that a heater or an air conditioner is on; and
increase or decrease the airflow rate through the heater or the air conditioner to increase or decrease the temperature.

14. A method for controlling a temperature within a vehicle, comprising:
obtaining, by a processor and from one or more sensors, an amount of sunload energy;
obtaining, by a processor and from memory, a blower map from a plurality of blower maps based on the amount of sunload energy, each blower map of the plurality of blower maps being associated with different airflow rates with different temperature ranges;
determining, by the processor, an airflow rate based on the blower map and an expected temperature; and
controlling, by the processor and using a heating, ventilation and air condition (HVAC) unit, the airflow rate to adjust a temperature within the vehicle to the expected temperature.

15. The method of claim 14, further comprising:
determining, by the processor and using a sensor, a speed of the vehicle; and
determining, by the processor, that the vehicle is stopped based on the speed of the vehicle.

16. The method of claim 14, further comprising:
setting, by the processor, a state of an engine of the vehicle to an off state, wherein controlling the airflow rate is in response to setting the state of the engine to the off state.

17. The method of claim 14, wherein obtaining, by the processor and from the memory, the blower map based on the amount of sunload energy includes:
determining that the amount of sunload energy is within a first range of a plurality of ranges for the sunload energy or within a second range of the plurality of ranges for the sunload energy; and
selecting a first blower map to obtain when the sunload energy is within the first range and select a second blower map to obtain when the sunload energy is within the second range.

18. The method of claim 14, further comprising:
obtaining a user input;
calculating a target airflow temperature based on the user input;
calculating a target evaporator temperature; and
determining the expected temperature based on the calculated target airflow temperature and the target evaporator temperature.

19. The method of claim 14, further comprising:
determining that a heater or an air conditioner is on; and
increasing or decreasing the airflow rate through the heater or the air conditioner to increase or decrease the temperature.

* * * * *